April 21, 1931.    C. F. SPERY    1,801,618
USE CONTROL DEVICE FOR ELECTRIC WASHING MACHINES AND THE LIKE
Filed March 21, 1927    5 Sheets-Sheet 1
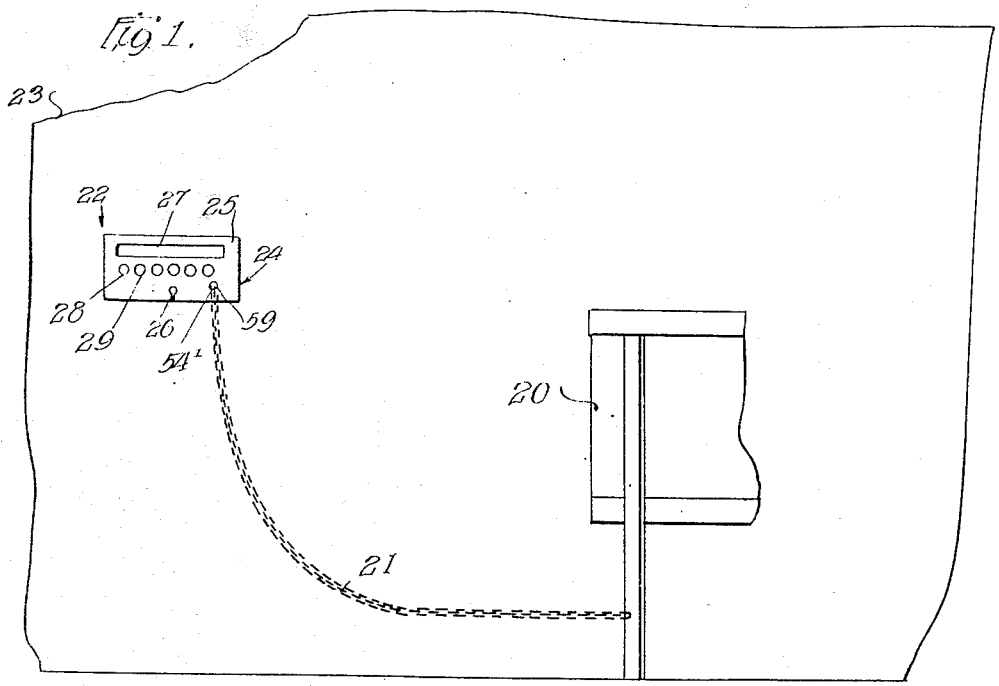
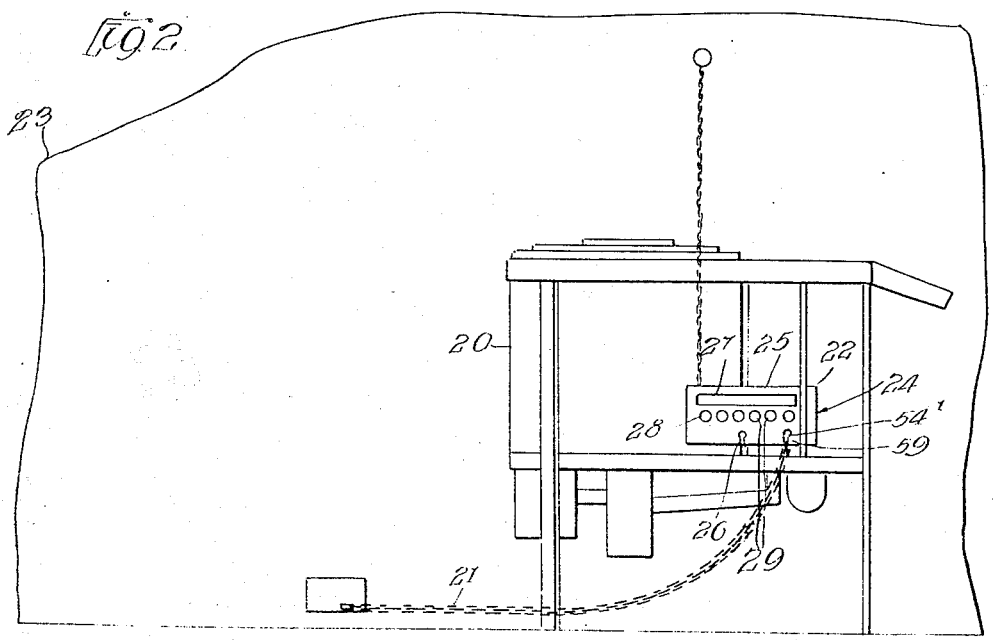

April 21, 1931. C. F. SPERY 1,801,618
USE CONTROL DEVICE FOR ELECTRIC WASHING MACHINES AND THE LIKE
Filed March 21, 1927 5 Sheets-Sheet 2
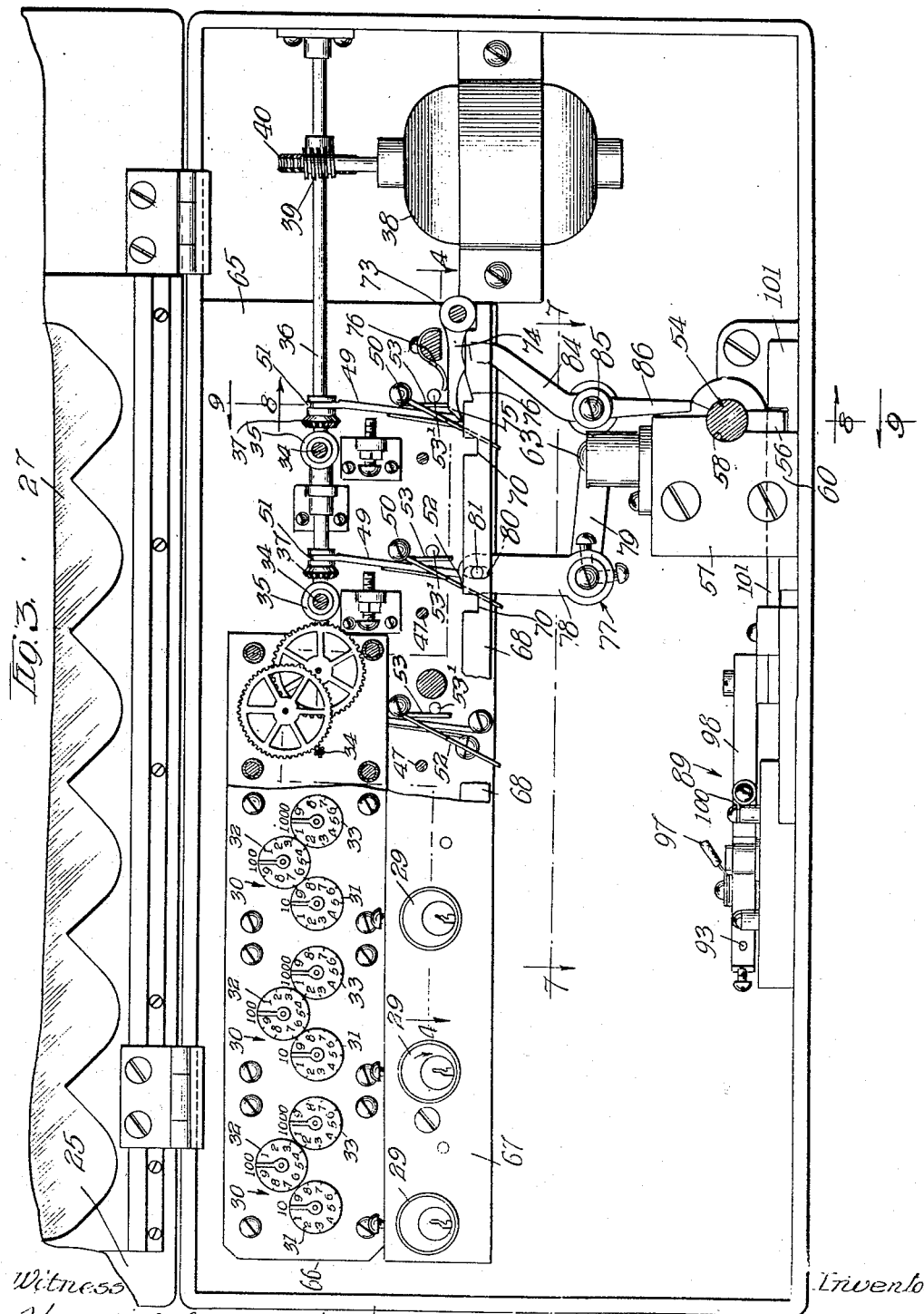
Witness
Harry R. White
Inventor
Charles F. Spery.
By Edward Fay Wilson Atty.

April 21, 1931.  C. F. SPERY  1,801,618
USE CONTROL DEVICE FOR ELECTRIC WASHING MACHINES AND THE LIKE
Filed March 21, 1927   5 Sheets-Sheet 4
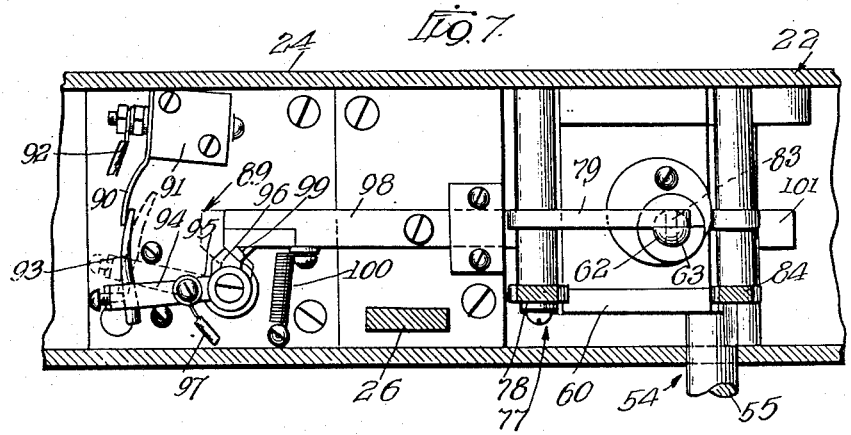
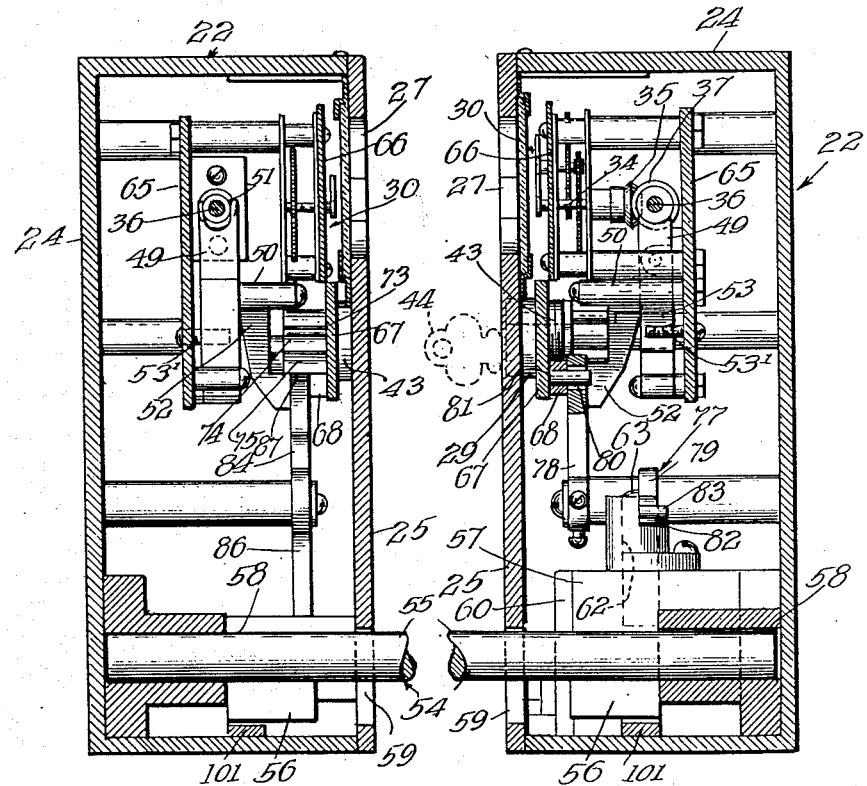
Witness:
Harry R. White
Inventor
Charles F. Spery.
By Edward Fay Wilson, Atty April 21, 1931.  C. F. SPERY  1,801,618
USE CONTROL DEVICE FOR ELECTRIC WASHING MACHINES AND THE LIKE
Filed March 21, 1927    5 Sheets-Sheet 5
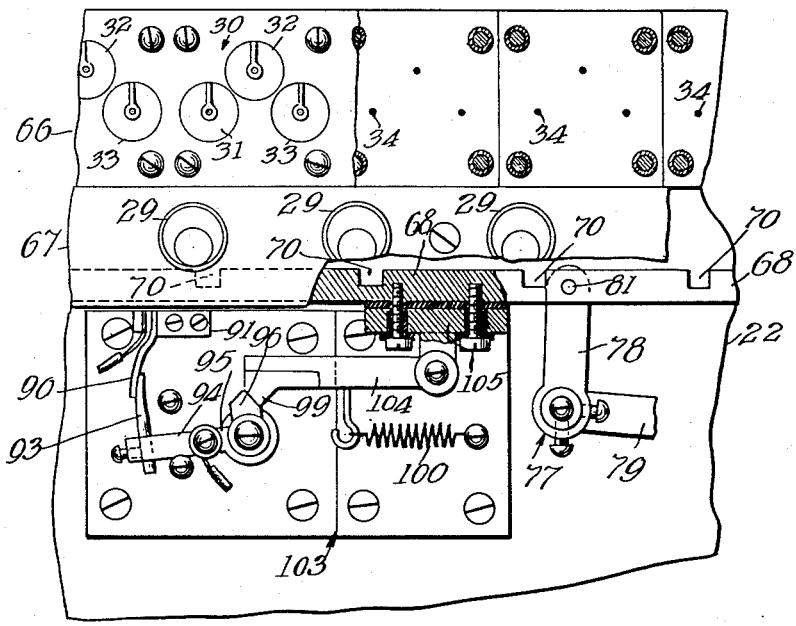
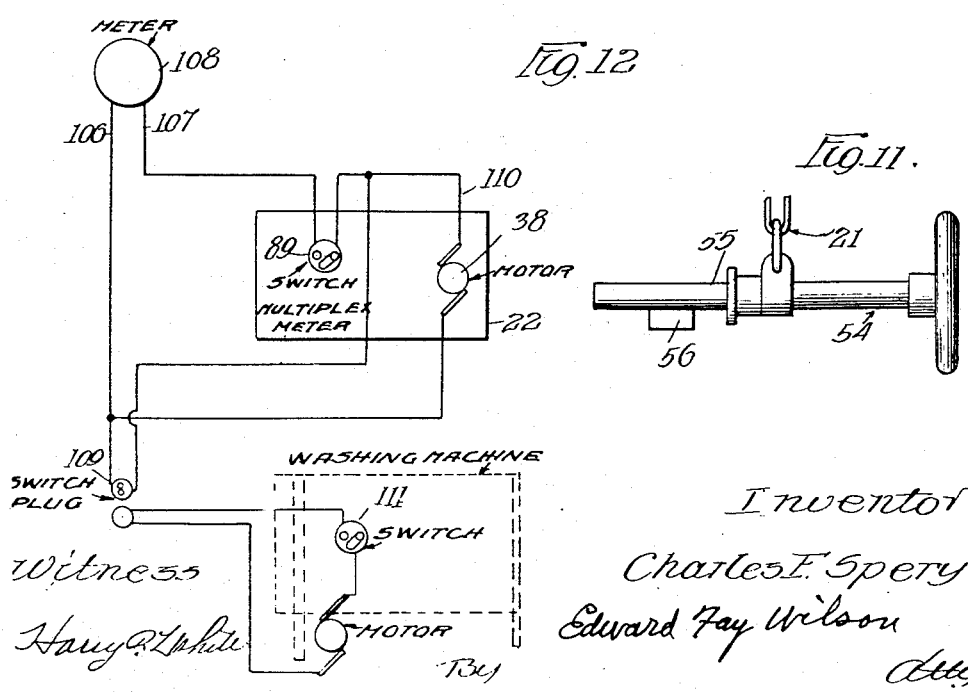

Patented Apr. 21, 1931

1,801,618

UNITED STATES PATENT OFFICE

CHARLES F. SPERY, OF CHICAGO, ILLINOIS

USE CONTROL DEVICE FOR ELECTRIC WASHING MACHINES AND THE LIKE

Application filed March 21, 1927. Serial No. 177,130.

My invention relates to a device, mechanism or system, by which the use of a machine such as a washing machine or the like, can be controlled. The invention is especially adapted for use in connection with electrically driven machines, and in the preferred form is arranged to make an independent record of elapsed time for each of several users of the machine.

It has been found that an electric driven washing machine or the like can be supplied for use in connection with an apartment building for the use of any of the tenants, and this invention is useful in keeping an accurate record of the time the machine is used by each one to whom the machine is accessible. From one aspect the invention relates to improvements in meters and has special reference to an improved meter whereby the time a machine, such as an electric washing machine, or other mechanism, has been used or is free to be used shall be recorded.

More specifically my invention contemplates the provision of a key controlled meter combined with some effective means of preventing the operation of the particular machine or device until the meter has been started or set so that it will be effective to record the lapse of time during which the controlled machine is free to be used.

In one form my invention is applied especially to the control of an electric washing machine and means are provided for effectively locking the washing machine in a position where it cannot be used and which means requires the use of an individual key to unlock the machine and start the meter.

The invention is particularly beneficial for controlling and measuring the use of a machine, such as an electric washing machine or the like, which is provided for the use of a number of different persons, each of which shall have an individual key for controlling an individual use indicating mechanism, such as a set of recording dials forming part of a multiple use meter, and which individual key will release the machine for use.

An important feature of the invention is an arrangement by which the individual control key is fixed against removal from the meter until the machine controlled thereby has been returned to and secured in its inoperative position.

Looked at in another way, the invention relates to a mechanism for keeping record of the lapse of time during which an electric switch is closed and through which switch electric power may be applied to the operation of an electrically driven machine, such as a washing machine.

The invention contemplates first an electric switch for applying power to a machine, such as an electric washing machine, means for operating the switch permanently attached to the machine and removably locked with the electric switch and removable from such locked position when the switch is closed for the transmission of power and a series of individual time recording mechanism, each capable of being set to record the time by its individual key and cooperating interlocking mechanism between the individual locks and the switch operating means by which the switch operator is locked against removal from the mechanism and also against operating the switch until the individual lock has been operated and the recording mechanism set to record the time, by which, when the indicator means is set to record the time, the individual key is locked against removal and the switch operator can be removed and by which, when the switch operator is returned and the switch is opened thereby, the individual key can be removed.

My invention will be more readily understood by reference to the accompanying drawings forming part of this invention and in which:—

Fig. 1 is a diagrammatic view showing a combined meter and lock secured to a wall and a washing machine detachably secured thereto;

Fig. 2 is a similar view but showing a combined meter and lock carried by a machine and a chain permanently secured at one end to a wall and at the other end detachably secured to the washing machine.

Fig. 3 is a front, fragmentary elevation of the combined meter and locking mechanism, the cover of the containing case shown open and various parts broken away to more clearly disclose the mechanism;

Fig. 7 is a fragmentary, horizontal, longitudinal section on the line 7—7 of Fig. 3;

Figure 4:
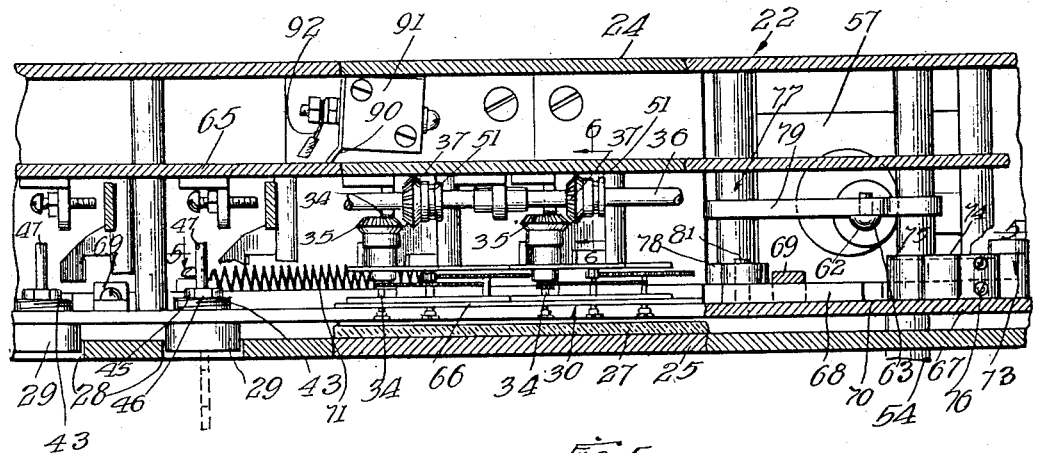
Fig. 4 is a fragmentary, horizontal, sectional view on the broken line 4—4 of Fig. 3.

Figs. 8 and 9 are vertical, transverse sections on the lines 8—8 and 9—9, respectively, of Fig. 3;

Fig. 10 is a fragmentary view similar to Fig. 3 but showing a modified structure;

Fig. 11 is a side elevation of the machine securing member or key; and

Fig. 12 is a diagram of the electric circuit.

In said drawings 20 illustrates an electric washing machine which is merely shown in connection with the mechanism as typical of the machines with which the invention is intended to be used and does not in any sense limit the scope of the invention.

In Fig. 1 the machine 20 is shown as having a chain 21 permanently attached at one end to a leg of the machine. The other or free end of the chain, in accordance with my invention, is adapted to be removably locked to a combined meter and lock device 22 which is permanently secured to wall 23 of a building. By this arrangement the machine is retained locked in a position where it cannot be used until released by the mechanism to be described.

In Fig. 2 the combined meter and lock 22 is shown as secured to the machine 20, the chain 21 being permanently secured at one end to a fixed object, such as the wall 23, and the free end of the chain as before removably secured to the device 22.

The combined meter and lock 22 comprises a casing 24 provided with a hinged front cover 25. The cover 25 is provided with a lock indicated by the key hole 26 (Figs. 1 and 2) by which the case can be retained closed against unauthorized opening. The cover 25 has a glass protected sight opening 27 through which the time recording devices can be seen and read. It is also provided with openings 28 through which individual locks 29 project so that they can be operated by individual keys. There is one lock 29 for each time registering device and the keys are all different so that a person having a key for one register can only set the mechanism to register time on but a specific one of the time recording devices.

The time registering devices, as shown at 30, Fig. 3, and of which the case shown would contain six are quite similar to a gas meter set of dials. Each thereof has three dials 31, 32 and 33; the first dial 31 is intended to indicate minutes up to 10 minutes for each revolution of its hand, the second dial 32 is intended to show hours up to 10 for one complete revolution of its hand, and the third dial 33 is intended to show hours up to 100 for a full revolution of its hand. The hands for these dials are of course geared together to cause a proper relative rotation of the hands. The hand of each of the minute dials 31 on each of the registers 30 is secured on a horizontal shaft 34, Fig. 3, and this shaft 34 carries a bevel wheel 35. There is provided a longitudinally arranged shaft 36 rotatably supported in the casing 24 and which has mounted thereon a number of bevel wheels 37, one for each register. Each of these bevel wheels 37 is slidable along the shaft 36 but is splined thereto to rotate therewith and is adapted to be moved into and out of mesh with its companion bevel wheel 35 associated with one of the registers. The shaft 36 is adapted to be rotated at times to cause a register to record the lapse of time to provide a visible record of the time the machine 20 may be or is operated.

As shown in Fig. 3, the shaft 36 is adapted to be driven by an electric motor 38 through worm 39 and worm gear 40 at a rate much slower than the motor. The motor is preferably one which automatically runs at a fixed number of revolutions per minute and the gearing through which the revolutions of the motor are transmitted to the registers is arranged so that the dials indicate minutes and hours as explained. It will be readily understood that the drive shaft 36 for the registers could be driven in other ways or by other means than a special motor.

Figure 5:
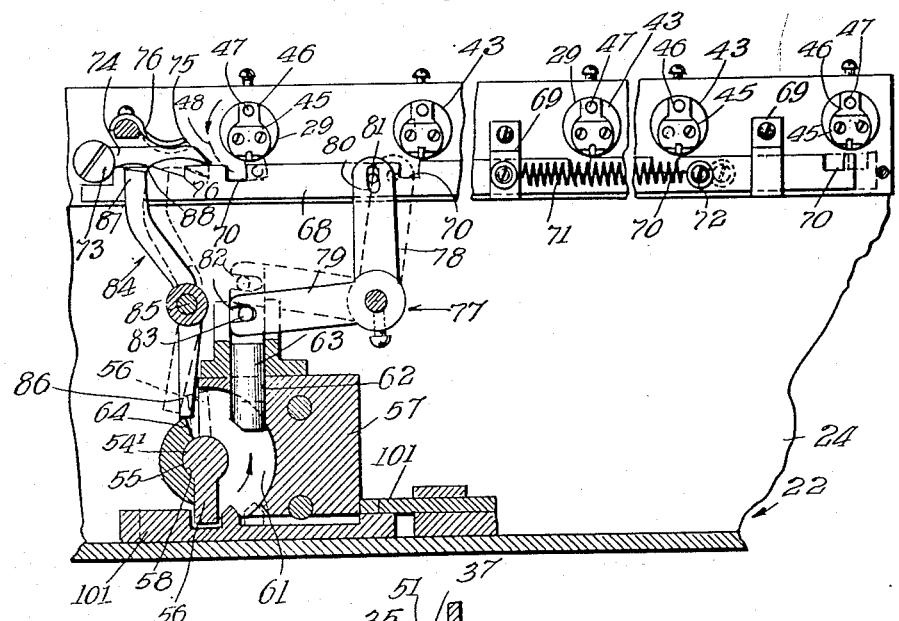
Fig. 5 is a fragmentary, vertical section on the broken line 5—5 of Fig. 4.
Figure 6:
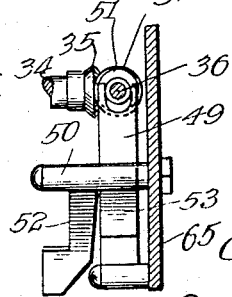
Fig. 6 is a detail, fragmentary, vertical section on the line 6—6 of Fig. 4.

For the purpose of controlling the use of the washing machine so that only authorized persons can use it and also so that the registers will be operated to register the time for each user separately, each register 30 is controlled by its own lock 29, and the locks 29, which may be of the well known Yale type, are arranged so that each lock requires its own individual key to operate. Locks of this type have a barrel 43 which can be rotated by the use of a key 44 made for the purpose and on the inner end of each lock barrel 43 there is secured a block 45 (see Fig. 5) which extends radially at one side beyond the barrel 43 to provide a radial projection 46. Each projection 46 carries a rigid longitudinally extending pin 47. Normally, as shown in Fig. 5, the projections 46 and pins 47 stand at the upper limit of their movement, as indicated by the dotted circle 48 in Fig. 5, when the barrel 43 is turned by a key it swings around to the left, as shown, through slightly more than 180 degrees to the lower limit of its movement. For the purpose of causing such movement of the lock to operatively connect its associated register with the drive shaft 36 so that it will be driven, a clutch lever 49 is provided for each gear 37 pivotally mounted between its ends on a horizontal transverse bearing pin 50. The upper end of this lever projects into a groove 51 in the hub of its gear 37 and when swung is adapted to move the gear along the shaft 36 into and out of mesh with its companion gear 35 on the minute shaft of its register. The lower end 52 of this lever projects down into the path of its associated projecting pin 47 so that as the lock is turned the projection 47 engages the lower end 52 of the lever 49, swinging it to the right, as shown in Fig. 3, and in consequence the upper end with the gear 37 to the left into mesh with its associated gear 35. In this position the associated register 30 is set to register whenever the shaft 36 is rotated by the motor 38. Normally the gear 37 is yieldingly held out of mesh by a spring arm 53 on the lever 49 which projects down below the pivot 50 and engages a fixed pin 53'. This spring arm 53 yields sufficiently to allow the lever 49 to swing around to cause the gear 37 to mesh with its associated gear 35. The setting of the register to register the revolutions of the shaft 36 and, as has been explained, the lapse of time is one function of the locks 29. Another important function is to release the controlled machine so that it can be taken to a suitable place for use.

As has been explained, in the preferred form of the device there is a chain 21 permanently secured at one end to the controlled machine 20 and its other end is adapted to be releasably secured or locked to the casing 22. For this purpose there is provided a large key 54, best shown in Fig. 11, permanently secured to the free end of the chain 21. This key is adapted to be locked against removal from the casing 22 and to be released by the operation of any of the locks 29 by the use of the individual keys 44.

The key 54 has a cylindrical stem 55 from which extends a lateral projection 56 rigid with the stem 55 and by means of which the key 54 is adapted to perform certain functions and to be locked against removal. A suitable lock block 57 (see Fig. 3) permanently secured within the casing 22 is provided and has a suitable opening 58 for receiving the operating end of the key 54. The opening 58 is extended at its entrance end into a key hole shape to permit the passage of the lateral projection 56 into the lock housing 57, and the front 25 of the case 22 is provided with a registering key hole opening 59 to permit the insertion of the key 54. The lock housing 57 has a front wall 60 behind which is a free space 61, Fig. 5, to permit the key 54 to be rotated around clockwise after being inserted. The upper part of the housing 57 is provided with a vertical bore 62 in which a plunger 63 is vertically movable. The lower end of this plunger projects down into the path of the key projection 56, as shown in Fig. 5. At times the plunger 63 is raised and the key 54 can be rotated until the key projection 56 strikes a fixed stop 64 in the housing 57. This stop 64 is beyond the plunger 63 which is raised at times to permit such rotation of the key 54 and at other times is dropped down to lock the key between the plunger and the shoulder 64, and thus prevent the removal of the key from the case.

If we assume that we start with the key locked against removal the projection 56 of the key will be situated between the plunger 63 and shoulder 64. To permit the release of the key 54 from its said locked position means are provided which are operable by each of the individual keys to lift the plunger 63 and retain it in lifted position until released by the return of the key 54 to its locked position.

It should be understood that for convenience of manufacture and assembly the operative mechanism associated with the individual locks is carried by a framework secured within the casing 22 and comprising a back plate 65, a front plate 66, behind the dials, and an auxiliary bar or flat plate 67 which carries the locks 29. Below the locks 29 and arranged in contact with the rear face of the lock plate 67 is a horizontally movable operating bar 68. Guide brackets or clips 69 slidingly mount the bar 68 on the plate 67. The bar 68 extends under all of the locks 29 and over the lock housing 57 and is provided in its upper edge with a notch 70 beneath each lock 29 and adapted to receive the projection 46 of the associated lock when the barrel of the lock is rotated from its normal unlocked position down through slightly more than 180 degrees to set its register, as hereinbefore described. In this engagement of the projection 46 in the notch 70 of the bar 68 is moved endwise about one-fourth of an inch against the tension of a spring 71 which is attached at one end to the bar 68 at 72 and at the other end to one of the guide brackets 69, as shown in Fig. 5, tends to hold the bar normally toward the left against a stop 73. To retain the bar 68 at the right hand or unlocked position, as shown in Fig. 5, there is a pivoted stop dog 74 provided, having a free ratchet shaped end 75 adapted to enter a notch 76 in the upper edge of the bar 68. The dog is lightly held down on the bar 68 by a flat spring 76. The dog 74 is pivotally mounted on a pin which forms the stop 73 before referred to. To cause the endwise movement of the bar 68, just described, to lift the locking plunger 63, there is a bell-crank 77 provided, having a vertical arm 78 for engagement by the bar 68 and a horizontal arm 79 for engagement with the plunger 63. The arm 78 extends alongside of the bar 68 and has a longitudinal slot 80 which receives a pin 81 carried by the bar 68. The arm 79 is bifurcated at its free end 82 and straddles a pin 83 extending out horizontally from the upper end of the plunger 63. As the bar 68 is moved to the right, Fig. 5, the bell-crank 77 operates to lift the plunger 63 out of the path of the projection 56 of the key 54 and permits the key to be rotated clockwise, Fig. 5, to its full line position in line with the extension of the key hole, so that it can be removed from the casing, thus releasing the washing machine for use.

The individual key 44, as we have seen, thus operates to set the register for registering the time and also operates to unlock the key 54 for the release of the machine. The parts remain in these relative positions, that is, the key 54 can be freely taken out or inserted again and the barrel of the lock 29 which was rotated by the key 44 is held by the engagement of its projection 46 in the notch 70 of the bar 68 against being returned to its original or key free position. The individual key 44 is thus locked against removal and the register is locked in operative condition until the dog 74 is lifted and the bar 68 is returned to its original position by the spring 71. In order that the register will be sure to show the true record of use means are provided operable by the main key 54 when it is returned to the housing 57 for lifting the dog 74, releasing the individual key and stopping the register. This means consists of a swinging lever 84 pivotally mounted on a fixed pin 85 to swing in a vertical plane. The lower end 86 of the lever 84 is arranged in the path of the projections 56 of the key 54 as same approaches the upper stop 64 and is adapted to be swung to the left, Fig. 5, by the key 54 when the same is returned and rotated to lock the washing machine. The upper end 87 of the lever 84 is adapted to contact with an inclined lower side 88 of the dog 74 and lift the dog as the lever is swung by the key 54. In this movement the upper end 87 of the lever 84 swings toward the right, Fig. 5. When this dog is lifted the bar 68 is drawn back to the left, Fig. 5, by the spring 71, the projection 46 of the individual lock 29 is released and the lock 29 can be rotated to remove the key 44. In such movement the register engaging lever 49 is also released and its spring arm 53 swings its upper end to the right, Fig. 3, thus disengaging the gears 35, 37 and stopping the register. At the same time the bell-crank 77 is moved by the projection 81 and the locking plug 63 is lowered into the path of the projection 56 against the key 54, thus locking the key against removal and retaining the washing machine in its unusable position.

In some instances the apparatus, as so far described, is all that is required, except of course some means of causing the motor 38 to run either when the washing machine is connected to the electric circuit or when the individual motor switch is closed to cause the washing machine to operate. Preferably I arrange the mechanism to control the actual possible operation of the washing machine by providing a current switch in the casing 22 and automatically operable to be closed either as the machine key 54 is rotated to be removed or as the individual lock 29 is rotated by its key 44.

Such a switch is shown at 89, Figs. 3 and 7. The switch, as shown, comprises a fixed spring contact arm 90 mounted on an insulation block 91 and connected to a lead wire 92, and a movable spring contact arm 93 adapted to contact with the arm 90 to close a circuit which can include the electric motor of the washing machine and the motor 38. The movable contact arm 93 is carried by an arm 94 of a bell-crank 95, the other arm 96 of which is V-shaped on its outer free end. The bell-crank is metal, it is insulated from the case and has attached thereto the lead wire 97.

As shown in Fig. 7, the circuit is closed by the contact of the arms 90 and 93. To open the circuit the bell-crank 97 is swung clockwise. This is accomplished by a longitudinally movable operating bar 98 having a V-shaped projection 99 adapted to move over the projection 96 from one side to the other and yieldingly held in contact with same by a tension spring 100. It will readily be understood that as the bar 98 is moved to the left, Fig. 7, the projection 99 will ride up the adjacent face of the projection 96 until they pass centers when the spring 100 will pull the bar 98 down and cause the bell-crank to rotate clockwise and quickly separate the contact arms 90—93, thus breaking the circuit. It will now be understood that a reverse movement of the bar 98 will close the circuit. The bar 98 is pivotally connected at its end opposite to the projection 99 to a bar 101 which is movable longitudinally of the case 22 and has a notch 102 adapted to receive the projection 56 of the key 54. This bar 101 lies beneath the key 54 and is adapted to be moved both forward and back by the key as the key 54 is rotated adjacent to its position where it is free to be removed from the casing. As shown in Fig. 5, the key 54 has just reached its position where it can be withdrawn and it has moved the bar to the left, Fig. 5, to the right, Fig. 3, and has closed the switch 89. It will be seen that when the key 54 is reinserted and is turned anti-clockwise, Fig. 5, to release the individual key 44 the first action of the key 54 will be to slide the bar 101 to the right, Fig. 5, the left, Fig. 3, and open the switch 89, thus opening the motor circuit.

Besides this method of operating the switch 89 through the medium of the machine key, I have arranged another method of operating it direct by the bar 68. This is illustrated in Fig. 10 wherein a switch 103 is shown which is similar to the switch 89. Instead, however, of moving the bar 101 through a second bar moved by the key 54 I connect a switch operating bar 104, which is similar to the bar 98, directly to the bar 68, pivotally mounting it at one end to an insulated bracket 105 which in turn is rigid with the bar 68. In this form the main switch will obviously be closed when the individual key 44 operates to set the register and if desired the current can be immediately supplied to the motor 38 and thereby the register will record the whole time that the washing machine is released for use, whether it is actually used or not. In this form, as in the first form, it will be understood that the bar 68 is released for return by the key 54.

In Fig. 12 I have illustrated a simple circuit showing the main supply wires 106—107 connected to a meter 108. The line 106 divides to the machine connection socket 109 and to the small motor 38. The other wire 107 connects to the switch 89 and through this switch to the other side of the socket 109 and branches off at 110 to the motor 38. Usually there is a washing machine motor switch 111 provided by which the machine can be started and stopped. By the use of the circuit shown the motor 38 will run when the switch 89 or 103 is closed in the one case when the key 54 is rotated to remove it, in the other case when the individual lock 29 is rotated to set the register for registering.

It will now be clear that in order to stop the register it is necessary to return the machine to its inoperative position and secure it there by locking the key 54 in the casing 22. In some situations it is not a necessity to register the time a machine is in use or released for use, but it is necessary to arrange the control so that it requires the use of an individual key to release the machine for use and, if the machine is not returned to its locked position, to show who was responsible for leaving it unlocked. This is accomplished by the combination of the individual key control of the machine key and in this case the registers may be omitted.

As many modifications of the invention will readily suggest themselves to one skilled in the art, I do not limit or confine my invention to the specific details of construction or combinations of devices herein shown and described.

I claim:

1. The combination with an electrically driven washing machine which is adapted to be readily moved from place to place, of means for rendering the machine unusable, comprising means for securing the machine to a fixed object, such as the wall of a building, in a position where it cannot be used, key controlled mechanism for releasing the machine from the non-use position, and means automatically operable for registering the duration of time the machine is released.

2. The combination with an electrically operated washing machine which is adapted to be readily moved from place to place, of means for securing the machine to a fixed object in a position where it cannot be used, key controlled means for releasing the machine for use, a registering device for indicating the duration of time the machine is released for use, said registering device being controlled in its operation by the same key means controlling the release of the machine.

3. The combination with a movable mechanism which is adapted to be used by a number of different persons, of means for securing the mechanism in a position where it cannot be used, a plurality of key controlled registers for registering the lapse of time that the mechanism is released for use, an individual key for controlling the starting and stopping of each register, means common to all of said individual key controls for releasing the machine and starting the register, and means for retaining the control key against removal during the time the machine is released.

4. The combination with a movable machine which is adapted to be successively used by a number of different persons, means for securing the machine to a fixed object in a position where it cannot be used, a plurality of key controlled registers for registering the lapse of time that the machine is released for use, an individual key for each register, means common to all of said key controls for releasing the machine and setting the registers for operation, an electric switch for controlling the operation of the machine, and switch closing and opening means operable by the machine, releasing means for closing the switch when the machine is released and opening the switch when the machine is again secured in place, and means interposed between the machine release means and the key control for retaining the key against removal until the machine has been returned to its secured position.

5. The combination with an electric driven machine, of means for securing the machine against removal in a position where it cannot be used, machine release means, a plurality of registers for registering the duration of time during which the machine is released for use, individual keys for controlling the registers, interlocking mechanism for locking the individual keys in machine release position during the time the machine is released, means for releasing the individual keys when the machine is again secured, an electric switch for controlling the application of electric current to the machine, and means for automatically closing the switch when the machine is released and for opening the switch when the machine is again secured.

6. In a mechanism of the kind described, a series of individual time registers, a similar series of register controls, the register controls being each operable only by an individual key, a securing device for an electrically operable machine adapted to be used by different persons, said securing device being permanently attached to the machine and adapted to retain the machine in an inoperative position until released by one of the individual keys, an electric switch for controlling the application of electric current to the machine, the securing device being rotatable in its position to release it from its machine securing position, a release bar operable by any one of said individual keys, means controlled by said release bar for preventing the rotation of said securing means until the release bar has been moved to release position by the operation of an individual key, means for locking the release bar against movement to release the individual key until the securing device has been returned and rotated to non-removable position, and means for automatically closing said electric switch as the securing means is rotated to remove it and for opening the switch as the securing means is rotated into non-removable position.

7. The improvements herein described and comprising the combination with an electrically operated washing machine, of means for registering the duration of time that the machine operates, such means including a plurality of normally inoperative registers, means common to all of the registers for operating same, individually key controlled means for selectively connecting one of the registers at a time with the operating means, means for detachably securing the machine in a non-using position and including a securing member normally locked against removal, means common to all of the control keys for unlocking the securing member for removal, means for preventing the removal of the control key while the securing member is released, and means operable by the securing member as it is returned to normal machine locked position for releasing the control key.

8. In a device of the character described, the combination with an electric switch, of an operator for opening and closing said switch, a register for registering the duration of time the switch is closed, a driver for the register, a key operable device for connecting the register to and disconnecting it from said driver, means actuated through the movement of the key operable device into driver connecting position to release the switch operator for movement into switch closing position and to lock the key operable device in driver connecting position, and means actuated by the switch operator on its movement into switch opening position to lock the operator in said position and to release the key operable device for movement into driver disconnecting position.

9. In a device of the character described, the combination with an electric switch, of an operator for opening and closing said switch, a register for registering the duration of time the switch is closed, a driver for the register, a key operable device for connecting the register to and disconnecting it from said driver, a locking device for the switch operator; an endwise movable bar connected with the locking device for actuating the same, said bar being moved in one direction by the key operable device on movement of the latter into driver connecting position to release the locking device from the switch operator and to lock the key operable device in driver connecting position, and means actuated by the switch operator on its movement into switch opening position to release the bar for movement in the opposite direction to reset the locking device and to release the key operable device for movement into driver disconnecting position.

10. In a device of the character described, the combination with an electric switch, of an operator for opening and closing said switch, a register for registering the duration of time the switch is closed, a driver for the register, a key operable device for connecting the register to and disconnecting it from said driver, a locking device for the switch operator, an endwise movable bar connected with the locking device for actuating the same, a co-acting pin and notch connection between the bar and the key operable device on moving the latter into driver connecting position for moving the bar to release the locking device from the switch operator, a pawl for holding the bar against return movement, and means operated by the switch operator on its movement into switch opening position to release the bar to return the locking device to locking position and to release the key operable device for movement into driver disconnecting position.

In testimony whereof, I have hereunto set my hand this 16th day of March, 1927.

CHARLES F. SPERY.